United States Patent
Niu (10) Patent No.: US 12,277,118 B2
(45) Date of Patent: Apr. 15, 2025

(54) QUERY OPTIMIZATION METHOD AND APPARATUS

(71) Applicant: Alipay (Hangzhou) Information Technology Co., Ltd., Zhejiang (CN)

(72) Inventor: Jian Niu, Zhejiang (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 17/354,465

(22) Filed: Jun. 22, 2021

(65) Prior Publication Data

US 2022/0035813 A1    Feb. 3, 2022

(30) Foreign Application Priority Data

Aug. 3, 2020   (CN) .......................... 202010766906.X (51) Int. Cl.
   *G06F 16/2453*   (2019.01)
   *G06F 11/34*     (2006.01)

(52) U.S. Cl.
   CPC .... *G06F 16/24544* (2019.01); *G06F 11/3419* (2013.01)

(58) Field of Classification Search
   CPC .............................................. G06F 16/24554
   See application file for complete search history.

(56) References Cited

U.S. PATENT DOCUMENTS

| | | | |
|---|---|---|---|
| 8,694,524 B1* | 4/2014 | Pham | G06F 16/289 707/759 |
| 9,183,254 B1* | 11/2015 | Cole | G06F 16/2453 |
| 2006/0253422 A1 | 11/2006 | Narasayya et al. | |
| 2008/0275742 A1* | 11/2008 | Vermette | G06F 16/211 705/7.11 |
| 2011/0022583 A1* | 1/2011 | Pennell, Sr. | G06F 16/24542 707/718 |
| 2011/0082859 A1 | 4/2011 | Deng et al. | |
| 2015/0161211 A1* | 6/2015 | Patel | G06F 16/24539 707/721 |
| 2017/0083573 A1* | 3/2017 | Rogers | G06F 16/2455 |

(Continued)

FOREIGN PATENT DOCUMENTS

| JP | 2011095918 A | * | 5/2011 |
|---|---|---|---|
| WO | WO 2017/019879 A1 | | 2/2017 |

OTHER PUBLICATIONS

JPatPlat English Language Translation of Morita (Year: 2009).*

(Continued)

*Primary Examiner* — Apu M Mofiz
*Assistant Examiner* — Farhad Agharahimi
(74) *Attorney, Agent, or Firm* — Finnegan, Henderson, Farabow, Garrett & Dunner, LLP (57) ABSTRACT

A query optimization method includes: obtaining a plurality of query tasks to be optimized, each query task including at least one subtask, and when a same query task includes at least two subtasks, a query dependence relationship existing between the at least two subtasks; combining the plurality of query tasks based on the query dependence relationship to obtain a combined task; and merging at least two subtasks in different query tasks of the plurality of query tasks based on the combined task to obtain a first merged subtask, the first merged subtask being executed to obtain query results of the at least two subtasks in the different query tasks.

11 Claims, 6 Drawing Sheets

(56) References Cited

U.S. PATENT DOCUMENTS

2019/0042621 A1* 2/2019 Qiu ................... G06F 16/24532
2021/0034625 A1* 2/2021 Shah .................... G06F 16/248

OTHER PUBLICATIONS

Extended European Search Report in European Application No. 21182225.9, mailed on Dec. 15, 2021.
Zhang, Chuan, et al., "An Evolutionary Approach to Materialized Views Selection in a Data Warehouse Environment", IEEE Transactions on Systems, Man, and Cybernetics—Part C: Applications and Reviews, vol. 31, No. 3, Aug. 2001, pp. 282-294.
European Patent Office, Communication issued in Application No. 21182225.9, dated Sep. 18, 2023, 8 pages.
Chen, L., et al., "Query grouping-based multi-query optimization framework for interactive SQL query engines on Hadoop", Concurrency Computat Pract Exper. 2018;30:e4676, https://doi.org/10.1002/cpe.4676, wileyonlinelibrary,com/journal/cpe, Apr. 25, 2018, 16 pages.
Michiardi, P., et al., "Cache-based Multi-query Optimization for Data-intensive Scalable Computing Frameworks", May 22, 2018, 14 pages.
Sellis, T.K., "Multi-Query Optimization", ACM Transactions on Database Systems, vol. 13, No. 1, Mar. 1988, pp. 23-52.

* cited by examiner

QUERY OPTIMIZATION METHOD AND APPARATUS

CROSS-REFERENCE TO RELATED APPLICATIONS

The present application is based upon and claims priority to Chinese Patent Application No. 202010766906.X, filed on Aug. 3, 2020, the entire content of which is incorporated herein by reference.

TECHNICAL FIELD

The present specification relates to the field of Internet technologies, and in particular, to a query optimization method and apparatus.

BACKGROUND

In an online query scenario, there is often a query requirement of high concurrency, high throughput, and low delay. For example, in an online transaction processing (OLTP) query scenario, there may be tens of thousands of batch query requests per second. Each batch query request ray include dozens or even hundreds of query tasks, and a query response time is required to be within 10 ms. In such a scenario of a large number of query tasks, the query tasks need to be optimized to improve query efficiency.

In the related query optimization technology, a query logic of a single query task can be optimized only in a range of the query task. However, many repeated query logics still exist in different query tasks. Therefore, query optimization in the range of the single query task still has low query efficiency.

SUMMARY

According to a first aspect, a query optimization method includes: obtaining a plurality of query tasks to be optimized, each query task including at least one subtask, and when a same query task includes at least two subtasks, a query dependence relationship existing between the at least two subtasks; combining the plurality of query tasks based on the query dependence relationship to obtain a combined task; and merging at least two subtasks in different query tasks of the plurality of query tasks based on the combined task to obtain a first merged subtask, the first merged subtask being executed to obtain query results of the at least two subtasks in the different query tasks.

According to a second aspect, a query optimization apparatus includes: a processor; and a memory storing instructions executable by the processor, wherein the processor is configured to: obtain a plurality of query tasks to be optimized, each query task including at least one subtask, and when a same query task includes at least two subtasks, a query dependence relationship existing between the at least two subtasks; combine the plurality of query tasks based on the query dependence relationship to obtain a combined task; and merge at least two subtasks in different query tasks of the plurality of query tasks based on the combined task to obtain a first merged subtask, the first merged subtask being executed to obtain query results of the at least two subtasks in the different query tasks.

According to a third aspect, a non-transitory computer readable storage medium has stored therein instructions that, when executed by a processor of a device, cause the device to perform a query optimization method according to the first aspect.

In embodiments of the present specification, a plurality of query tasks are combined to obtain a combined task, and subtasks in different query tasks are merged into one task based on the complete combined task. Because subtasks optimized based on the combined task belong to different query tasks, query optimization in ranges of a plurality of different query tasks is implemented. Compared with an optimization method of a single query task, repeated query logics in different query tasks can be merged and optimized, thereby improving query efficiency. Further, because tasks can be merged in the ranges of the plurality of different query tasks, a high throughput of batch queries may be realized.

It should be understood that the general description above and the detailed description below are merely examples and do not limit the present specification.

BRIEF DESCRIPTION OF DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Embodiments are described in detail herein, and examples of which are presented in the accompanying drawings. When the following description refers to the accompanying drawings, unless specified otherwise, same numbers in different accompanying drawings represent sane or similar elements. Implementations described in the following example embodiments do not represent all implementations consistent with the present specification. On the contrary the implementations are merely examples of apparatuses and methods that are recited in the appended claims and consistent with some aspects of the present specification.

Terms used in the present specification are merely for illustrating example embodiments, and are not intended to limit the present specification. For example, the terms "first" and "second" may be used to describe various types of information, and the information is not limited to the terms. These terms are merely used to differentiate between information of the same type. For example, without departing from the scope of the present specification, first information can also be referred to as second information, and similarly, second information can be referred to as first information.

Depending on the context, for example, the word "if" used herein can be explained as "while" "when" or "in response to determining".

In an online query scenario, there is often a query requirement of high concurrency, high throughput, and low delay. For example, in an online transaction processing (OLTP) query scenario during promotion of online retailers, there may be tens of thousands of batch query requests per second. Each batch query request may include dozens or even hundreds of query tasks, and a query response time is required to be within 10 ms. In such a scenario of a large number of query tasks, the query tasks need to be optimized to improve query efficiency.

In the related query optimization technology a query logic of a single query task can be optimized only in a range of the query task. For example, two same query logics in a same query task are merged into one query logic, thereby avoiding repeated execution of a same query logic. However, many repeated query logics still exist in different query tasks. When different query tasks are executed, many same query logics are repeatedly executed. As a result, in a method for optimizing a single query task, query efficiency is still low and even query resources are wasted.

In view of the above, embodiments of the present specification provide a query optimization method to merge a plurality of query tasks into a combined task. In ranges of different query tasks included in the combined task, query logics that belong to different query tasks can also be optimized.

It should be noted that the query optimization method provided in the present specification can be applied to various online queries that can include but are not limited to an OLTP query or an online analytical processing (OLAP) query.

Figure 1:
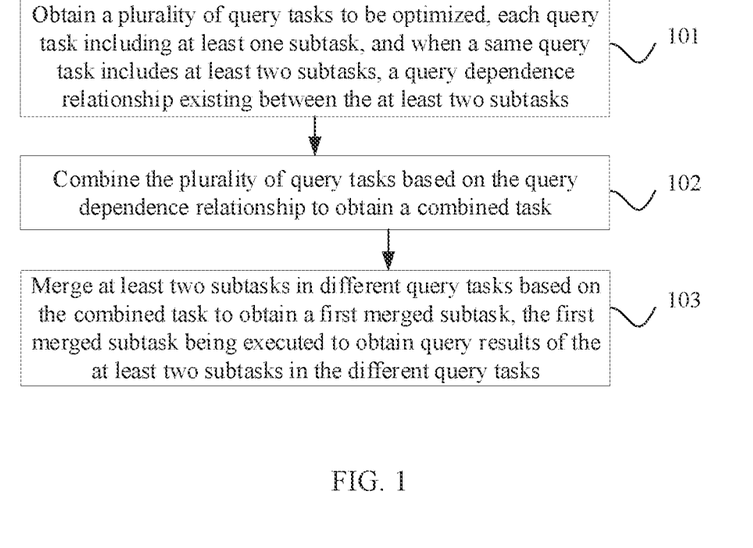
FIG. 1 is a flowchart illustrating a query optimization method according to an embodiment.

FIG. 1 is a flowchart illustrating a query optimization method according to an embodiment. As shown in FIG. 1, the method includes the following steps.

Step 101: Obtain a plurality of query tasks to be optimized, each query task including at least one subtask, and when a same query task includes at least two subtasks, a query dependence relationship existing between the at least two subtasks.

In an embodiment, the query task is a process of obtaining a final query result from a data source based on a query condition. For example, when the query condition is "male name", a "name" that meets the condition can be found from a corresponding data source based on the query condition, and used as a query result. This is a complete query task.

Each query task includes different query logics, and a query result of the query task can be finally obtained by executing the query logics in the query task. In an embodiment, different query logics are represented by using subtasks in a query task, and each query task can include one or more subtasks.

For example, when the query condition is "male name", the query task can include only one subtask: a name that meets the condition is found from a data source based on the query condition "male". That is, a query result of the query task can be obtained by querying the subtask.

For example, when the query condition is "name of a male taller than 175 cm", the query task can include two subtasks: subtask 1: name information that meets a height condition needs to be found from a data source based on the query condition "taller than 175 cm", and is used as a query result of subtask 1; and subtask 2: a name that meets a gender condition needs to be found from the query result of subtask 1 based on the query condition "male".

That is, a query result of the query task needs to be obtained after the two subtasks are both queried. Based on a same principle, it can be understood that when a query condition is more complex, a query task may include three or more subtasks.

When a same query task includes two or more subtasks, a query dependence relationship exists between the plurality of subtasks. For example, if execution of one subtask in a query task needs to depend on an execution result of another subtask in the query task, a query dependence relationship exists between the two subtasks.

Figure 2:
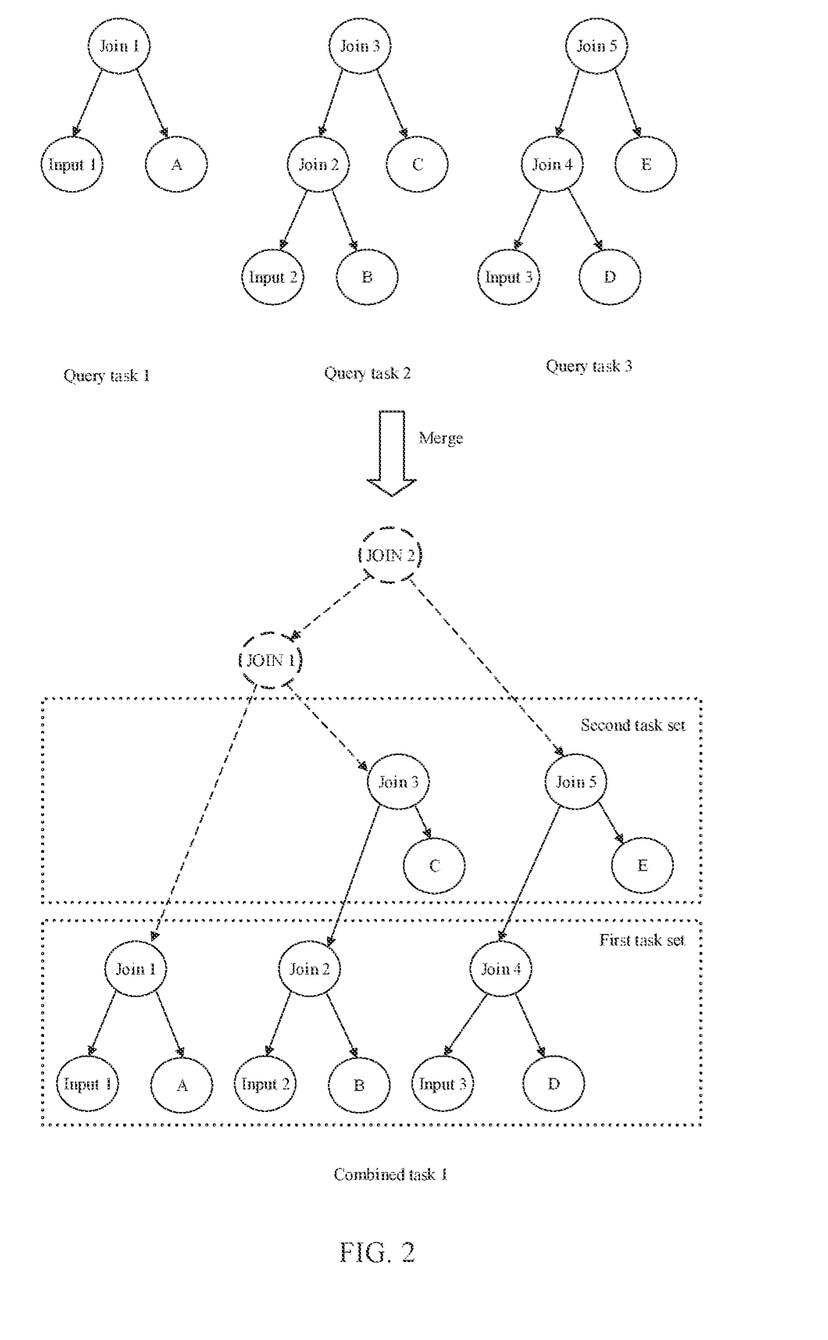
FIG. 2 is a schematic diagram illustrating a combined task according to an embodiment.

FIG. 2 illustrates a plurality of query tasks in a form of a directed acyclic graph (DAG): query task 1, query task 2, and query task 3, according to an embodiment. Query task 1 is used as an example for description. Referring to FIG. 2, Node "Input1" represents a query entry in which a query condition of a query task including the node can be input. Node "A" represents a query data source corresponding to the query task including the node, such as an HBASE database or a MySQL database. Node "Join1" represents a query result obtained through query based on the query condition in "Input1" and the query data source in "A".

In the embodiment, query task 1 includes only subtask a, and subtask a is obtained by connecting the three nodes "Input1", "A", and "Joint". When subtask a is executed, query can be performed based on the query condition in Input1 and the query data source in A, to obtain a query result of subtask a. Because query task 1 includes only subtask a, the query result of subtask a is a query result of query task 1.

In the embodiment, query task 2 includes two subtasks: subtask b and subtask c.

Subtask b is obtained by connecting three nodes: "Input2", "B", and "Join2". Executing subtask b can obtain a query result of subtask b. A process of obtaining the query result of subtask b is the same as the process of obtaining the query result of subtask a.

Subtask c is obtained by connecting three nodes: "Join2" "C", and "Join3". "Join2" further exists as a query condition of subtask c while representing the query result of subtask b. When subtask c is executed, query can be performed based on the query result "Join2" of subtask b and a query data source in C, to obtain a query result of subtask c. Because no other subtask needs to be executed after subtask c in the embodiment, the obtained query result of subtask c is a query result of the query task 2. Based on a same principle as query task 2, query task 3 includes subtask d and subtask e, and subtask e depends on subtask d.

For query task 2 in FIG. 2, because execution of subtask c depends on the query result of subtask b as the query condition, a query dependence relationship exists between subtask b and subtask c. In addition, the query dependence relationship may specifically be that subtask c depends on subtask b.

Step 102: Combine the plurality of query tasks based on the query dependence relationship to obtain a combined task.

In Step 102, a plurality of different query tasks can be combined based on a query dependence relationship between subtasks in each query task, to obtain a complete combined task.

In an embodiment, a to-be-connected subtask can be determined based on the query dependence relationship between the subtasks in each query task. FIG. 2 is used as an example. Because query task 1 includes only subtask a, subtask a can be used as a to-be-connected subtask. Based on the query dependence relationship between subtask b and subtask c in query task 2, subtask c can be used as a to-be-connected subtask because subtask c is the last subtask when query task 2 is executed. Based on the query dependence relationship between subtask d and subtask e in query task 3, subtask e can be used as a to-be-connected subtask.

The to-be-connected subtasks are connected to connect the query tasks together to obtain a complete combined task. For example, query task 1, query task 2, and query task 3 can be connected by using two nodes "JOIN1" and "JOIN2", to obtain complete combined task 1. Nodes "JOIN1" and "JOIN2" do not affect final query results of the connected different query tasks, that is, a query result of each query task obtained based on combined task 1 is the same as a query result obtained by separately executing each query task.

In an embodiment, each subtask includes a query data source, and query data sources can be data sources of different physical architectures. FIG. 2 is used as an example. Query data source "A" of subtask a can be an HBASE database. Query data source "B" of subtask b can be a MySQL database. Query data source "C" of subtask c cam be an HBASE database. Between different subtasks in a same query task, query data sources can be heterogeneous data sources. Between subtasks in different query tasks, query data sources can be heterogeneous data sources. In this embodiment, a physical structure of a data source in a subtask is not limited, and a query data source in any subtask can be a heterogeneous data source.

In an embodiment, before the combining the plurality of query tasks to obtain the combined task, the method further includes: determining a first query logic from a query task based on a predetermined determining condition, the first query logic including at least one subtask in the same query task; and storing a query result of the first query logic. After the combining the plurality of query tasks to obtain the combined task, the method further includes: if determining that a query logic that is the same as the first query logic exists in the combined task, using the query result of the first query logic as a query result of the query logic that is the same as the first query logic.

In the above embodiment, before a subtask of a query task in the combined task is optimized, a common query logic can be determined in the same query task as the first query logic based on the predetermined determining condition. The predetermined determining condition can be a number of execution times, an execution frequency, etc. For example, if a number of execution times of a certain query logic is greater than a predetermined number of times, it can be determined that the query logic is a common query logic and is used as the first query logic. The above query logic can be one subtask or a plurality of subtasks in a same query task that have a query dependence relationship.

When a subtask in the combined task is executed, if determining that a query logic that is the same as the first query logic exists, the query result of the first query logic can be directly obtained without repeatedly executing the same query logic.

Combined task 1 shown in FIG. 2 is used as an example. Before a subtask in combined task 1 is executed, the first query logic can be first determined. For example, subtask b can be used as the first query logic, or query task 2 including subtask b and subtask c can be used as the first query logic. If the determining condition is that the number of execution times is greater than the predetermined number of times, subtask b is used as the first query logic when a number of execution times of subtask b is greater than the predetermined number of times to execute subtask b and store the query result.

When a subtask in combined task 1 is executed, if determining that a query logic "subtask b" that is the same as the first query logic exists in combined task 1, the stored query result of the first query logic can be used as the query result of subtask b without repeatedly executing a query process of subtask b.

Step 103: Merge at least two subtasks in different query tasks based on the combined task to obtain a first merged subtask, the first merged subtask being executed to obtain query results of the at least two subtasks in the different query tasks.

As described above, in the related query optimization technology, only a single query task can be optimized. For example, in the example in FIG. 2, query optimization in the related technology can be performed only on query task 1, or only on query task $2_1$ or only on query task 3.

In step 103 of the present embodiment, at least two subtasks that belong to different query tasks can be merged based on the combined task obtained by combining different query tasks, to obtain the first merged subtask. As such, query results of a plurality of subtasks can be obtained by performing the first merged subtask once. A method for merging subtasks can be merging a plurality of same subtasks into one task, to remove a repeated subtask. Alternatively, the plurality of subtasks can be merged into one task based on a same part of the plurality of subtasks. For example, subtasks whose storage paths have a same part can be merged into one executable task.

Combined task 1 shown in FIG. 2 is used as an example. In the present step, subtasks that belong to different query tasks can be merged based on combined task 1. For example, if subtask a in query task 1 is the same as subtask b in query task 2, subtask a and subtask b can be merged into a first merged subtask. As such, the query results of both subtask a and subtask b can be obtained by executing the first merged subtask only once. For example, subtask a can be executed only once, or subtask b can be executed only once. A same determining condition of the two subtasks can be: query conditions and query data sources that are included in the two subtasks are the same. In this method, repeatedly executing a query process of a subtask is removed, and an effect of query optimization is implemented. In addition, in the de-duplication optimization process, because subtask a and subtask b belong to different query tasks, this optimization method implements cross-query task optimization.

In addition to the above de-duplication optimization method to obtain the combined task, other methods for merging subtasks in different query tasks may also be used, which is not limited in this embodiment. For example, if subtask a is the same as subtask c, subtask a and subtask c can be merged to obtain a first merged subtask. The query results of both subtask a and subtask c are obtained by executing the first merged subtask.

In the query optimization method described above, subtasks in the combined task for optimization belong to different query tasks, cross-query task optimization is implemented based on the combined task in this method. Compared with optimization of a single query task, query efficiency is improved. Further, because cross-query task optimization is implemented in the method, repeated queries existing in different query tasks can be greatly reduced, and query resources can be saved.

In an embodiment, the merging the at least two subtasks in different query tasks to obtain the first merged subtask includes: determining a non-dependent subtask in each query task based on the query dependence relationship to form a first task set of the combined task; and merging at least two subtasks in the first task set to obtain the first merged subtask.

In the above embodiment, a subtask that can be executed without depending on another subtask needs to be determined from each query task based on a query dependence relationship between subtasks in the query task, and subtasks determined from the query tasks form the first task set. Combined task 1 shown in FIG. 2 is used as an example. Subtask a in query task 1 can be executed without depending on another subtask. Subtask b in query task 2 does not depend on another subtask. Subtask d in query task 3 does not depend on another subtask. Therefore, subtask a, subtask b, and subtask d can form a set to obtain the first task set of combined task 1.

After the first task set of the combined task is determined, optimization can be performed based on a feature of the subtask in the first task set because all the subtasks in the first task set are non-dependent subtasks. In this embodiment, the at least two subtasks in the first task set can be merged to obtain the first merged subtask. As such, query results of a plurality of subtasks used for combination can be obtained by executing the first merged subtask once.

In this embodiment, because the subtasks in the first task set belong to different query tasks, the subtasks of the first combined task are optimized, thereby implementing an effect of cross-query task optimization. Therefore, an optimization effect and query efficiency are improved. In addition, cross-query task optimization can reduce repeated query logics in different query tasks and save query resources.

In an embodiment, after the forming the first task set of the combined task, the method further includes: concurrently executing the subtasks in the first task set; and placing, into a cache, a query result of a subtask whose query duration meets a predetermined condition.

In the above embodiment, a plurality of subtasks in the first task set can be executed concurrently. Therefore, in a process of concurrently executing the plurality of subtasks, query duration used by the subtasks is also different because specific query processes of the subtasks are different. Query duration of one or more subtasks may be longer (longer than query duration of another subtask), and query duration of concurrent execution may be affected by the one or more query tasks. In the above embodiment, the query result of the subtask whose query duration meets the predetermined condition can be placed into the cache to accelerate query. The predetermined condition can include but is not limited to a query duration threshold. For example, the predetermined condition can be: query duration is longer than 10 ms.

In an embodiment, each subtask includes a query condition and a query data source. The merging the at least two subtasks in the first task set to obtain the first merged subtask includes: merging at least two subtasks in the first task set that have a same query condition and query data source, to obtain the first merged subtask.

In the above embodiment, each subtask includes a query condition and a query data source.

As shown in FIG. 2, subtask a in combined task 1 includes the query condition input in node "Input1" and the query data source in node "A". Subtask b includes the query condition input in node "Input2" and the query data source in node "B". Subtask c can use the query result "Join2" of subtask b as the query condition, and further includes the query data source in node "C".

In this embodiment, subtasks that have a same query condition and query data source can be determined from the subtasks in the first task set for de-duplication.

If query conditions and query data sources of two subtasks are the same, it can be considered that the two subtasks are the same, and a same query result is obtained by executing the two subtasks. Therefore, a plurality of subtasks in the first task set that have a same query condition and query data source can be merged to obtain the first merged subtask. Query results of the plurality of subtasks can be obtained by executing the first merged subtask once. The first merged subtask can be one of a plurality of subtasks used for merging. Therefore, only one of the subtasks can be executed after the merging, to avoid repeatedly executing a same query logic.

FIG. 2 is used as an example. In the first task set, de-duplication can be performed if the query condition input in "Input1" of subtask a is the same as the query condition input in "Input2" of subtask b and query data source "A" of subtask a is the same as query data source "B" of subtask b. That is, subtask a and subtask b can be merged to obtain the first merged subtask, for example, subtask a is used as the first merged subtask. As such, the query results of both subtask a and subtask b are obtained by executing subtask a once.

In this embodiment, when the first task set is determined from the combined task, de-duplication optimization can be performed on the subtasks in the first task set. Because the subtasks in the first task set belong to different query tasks, in this de-optimization method, cross-query task optimization is implemented, repeated query logics in different query tasks are reduced, query efficiency is improved, and query resources are saved.

In an embodiment, each subtask includes a query data source. The merging the at least two subtasks in the first task set to obtain the first merged subtask includes: determining a plurality of subtasks with a same query data source from the first task set; and merging at least two subtasks whose query paths have a same part in the plurality of subtasks with the same query data source, to obtain the first merged subtask.

In the above embodiment, when the first task set is determined from the combined task, subtasks whose storage paths have a same part can be merged.

FIG. 2 is used as an example. In the first task set, assume that the query data source of subtask a is an HBASE database, and the query data source of subtask b is also an HBASE database. In this embodiment, it can be determined from the first task set that subtask a and subtask b are subtasks with a same query data source.

For example, the HBASE database is used as the query data source. The following illustrates five query tasks:

Query1: T1, KEY1, f, col1;
Query2: T1, KEY1, f, col1;
Query3: T1, KEY1, f, col2;
Query4: T1, KEY2, f, col3;
Query5: T2, KEY3, f, col4;

Each query task includes a table, a row, a column cluster, and a column. For example, when a query process of query task Query1 is executed, a query path is successively as follows: table-T1, row-KEY1, column cluster-f, and column-col1. Finally, a query result of query task Query1 is obtained.

In this embodiment, subtasks whose query paths have a same part in subtasks with a same query data source can be merged into the first merged subtask.

The HBASE database is still used as an example. Assume that the first task set includes a total of five subtasks: query tasks Query1 to 5. Because query paths of two subtasks Query1 and Query2 are totally the same, only subtask Query1 can be executed, and a query result of Query2 can be obtained at the same time. Query1 can be referred to as a first merged subtask obtained by merging Query1 and Query2.

Because query paths of two subtasks Query1 and Query3 are different only in terms of "column", the two query tasks can be merged into a "Get task". The "Get task" can be referred to as a first merged subtask obtained by merging Query1 and Query3.

Because query paths of Query1 and the Query4 are different in terms of "row" Query4 and the "Get task" can be further merged into a "MultiGet task". The "MultiGet task" can be referred to as a first merged subtask obtained by merging Query1, Query3, and Query4.

Because query paths of Query5 and other subtasks are different in terms of "table", Query5 can only serve as a "new Get task". Based on the above merging processes, a total of five subtasks Query1 to 5 can be merged into two first merged subtasks: a "MultiGet task" and a "new Get task".

An example implementation process of merging the subtasks in the first task set based on the HBASE database as a query data source is described above. For different query data sources such as the MySQL database, the subtasks in the first task set can be merged based on a query feature of the database. In the above merging process, merging is performed based on a same query path. In another embodiment, another form of task merging can be performed based on a query feature of a query data source.

Query results of a plurality of subtasks used for merging can be obtained after the first merged subtask is executed. With reference to the above example of the HBASE database, query results of a total of four subtasks Query1 to 4 can be obtained after the "MultiGet task" is executed.

In this embodiment, after a plurality of subtasks with a same data source are determined from the first task set, the subtasks can be merged based on the query path. In this method, a number of query times is reduced, a number of times of accessing a query data source is reduced, and a query time is reduced. In addition, in this merging method, cross-query task optimization is also implemented, query efficiency is improved, and query resources are saved.

In an embodiment, after the forming the first task set of the combined task, the method further includes: determining, from the combined task based on the query dependence relationship, subtasks that depend on each subtask in the first task set, to form a second task set of the combined task; executing the subtasks in the first task set, and storing query results; and if the second task set and the first task set have same subtasks with a same query condition and query data source, using a query result of the subtask in the first task set as a query result of the same subtask in the second task set.

In the above embodiment, the subtasks in the second task set can be determined based on the subtasks in the first task set and a query dependence relationship between subtasks in each query task. The subtask in the second task set depends on the subtask in the first task set.

FIG. 2 is used as an example. Subtask c can be used as a subtask in the second task set because subtask c depends on subtask b in the first task set. Subtask e can be used as a subtask in the second task set because subtask e depends on subtask d in the first task set.

The subtasks in the first task set are executed to obtain and store query results. For example, a plurality of subtasks in the first task set are concurrently executed to obtain query results of the plurality of subtasks, and then the query results are correspondingly stored. For example, in FIG. 2, the subtasks in the first task set can be concurrently executed, and the query results are correspondingly stored.

Because the subtask in the second task set depends on the subtask in the first task set, a query result obtained after the subtask in the first task set is executed can be used as a query condition of the subtask in the second task set. In this case, the subtask in the second task set can be compared with a subtask that has been executed in the first task set. If the second task set includes a same subtask that has a same query condition and query data source as the subtask in the first task set, a query result of the corresponding same subtask can be directly obtained from the stored query results, and a query logic of the same subtask in the second task set does not need to be executed again.

Combined task 1 shown in FIG. 2 is used as an example. Combined task 1 includes the first task set and the second task set. A plurality of subtasks in the first task set are executed in advance, and corresponding query results are stored. Assume that query data source "E" of subtask e in the second task set is the same as query data source "B" of subtask b in the first task set and both are the HBASE database, and the query result of subtask d in the first task set is the same as the query condition input in "Input" of subtask b. In this case, it can be determined that subtask e in the second task set and subtask b in the first task set are same subtasks with a same query condition and query data source. Because subtask b has been already executed and the query result is stored, the query result of subtask b can be directly obtained as the query result of subtask e without executing subtask e.

In this embodiment, query results of executed subtasks can be stored. When a subtask is executed subsequently, a corresponding query result is directly obtained if a same subtask exists. In a process of optimizing the subtask in the second task set by using the subtask in the first task set, cross-query task optimization is still implemented, repeated queries in different query tasks are reduced, query efficiency is improved, and query resources are saved.

Figure 3:
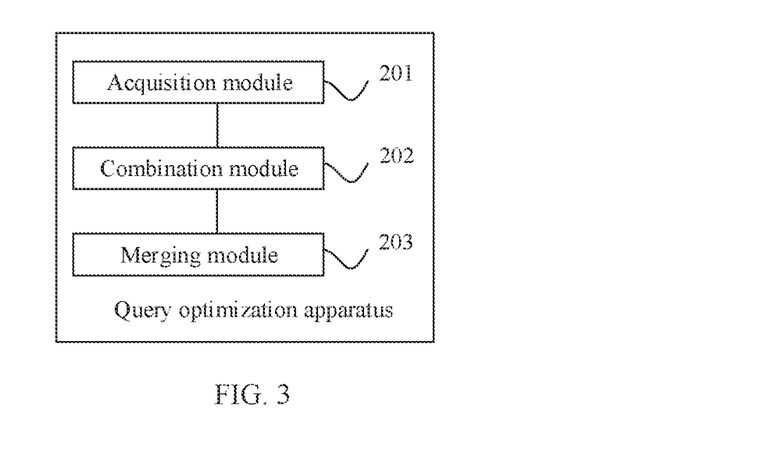
FIG. 3 is a schematic diagram illustrating a query optimization apparatus according to an embodiment.

FIG. 3 is a schematic diagram of a query optimization apparatus according to an embodiment. The apparatus can include an acquisition module 201, a combination module 202, and a merging module 203.

The acquisition module 201 is configured to obtain a plurality of query tasks to be optimized, each query task including at least one subtask, and when a same query task includes at least two subtasks, a query dependence relationship existing between the at least two subtasks.

The combination module 202 is configured to combine the plurality of query tasks based on the query dependence relationship to obtain a combined task.

The merging module 203 is configured to merge at least two subtasks in different query tasks based on the combined task to obtain a first merged subtask, the first merged subtask being executed to obtain query results of the at least two subtasks in the different query tasks.

Figure 4:
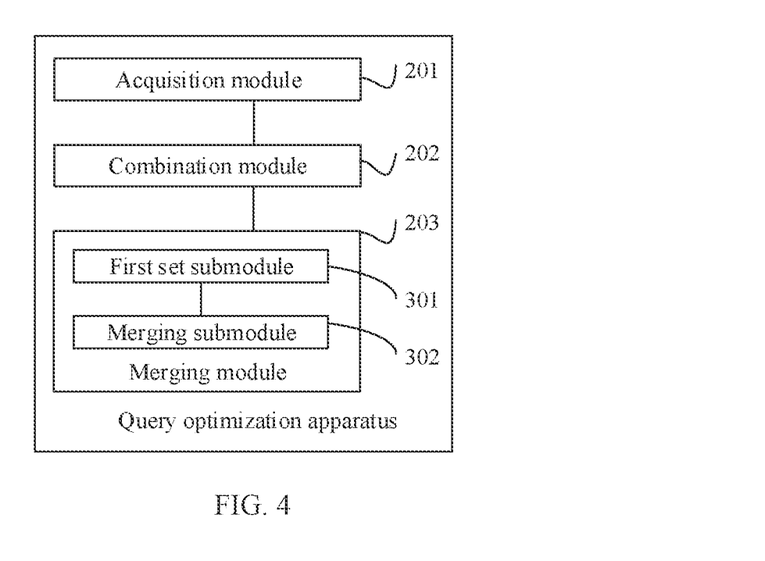
FIG. 4 is a schematic diagram illustrating a query optimization apparatus according to an embodiment.

FIG. 4 is a schematic diagram of a query optimization apparatus according to an embodiment. In the embodiment, the merging module 203 includes: a first set submodule 301, configured to determine a non-dependent subtask in each query task based on the query dependence relationship to form a first task set of the combined task; and a merging submodule 302, configured to merge at least two subtasks in the first task set to obtain the first merged subtask.

In an embodiment, each subtask includes a query condition and a query data source, and that the merging submodule 302 is configured to merge the at least two subtasks in the first task set to obtain the first merged subtask includes: merging at least two subtasks in the first task set that have a same query condition and query data source, to obtain the first merged subtask.

In an embodiment, each subtask includes a query data source, and that the merging submodule 302 is configured to merge the at least two subtasks in the first task set to obtain the first merged subtask includes: determining a plurality of subtasks with a query data source from the first task set; and merging at least two subtasks whose query paths have a same part in the plurality of subtasks with the same query data source, to obtain the first merged subtask.

Figure 5:
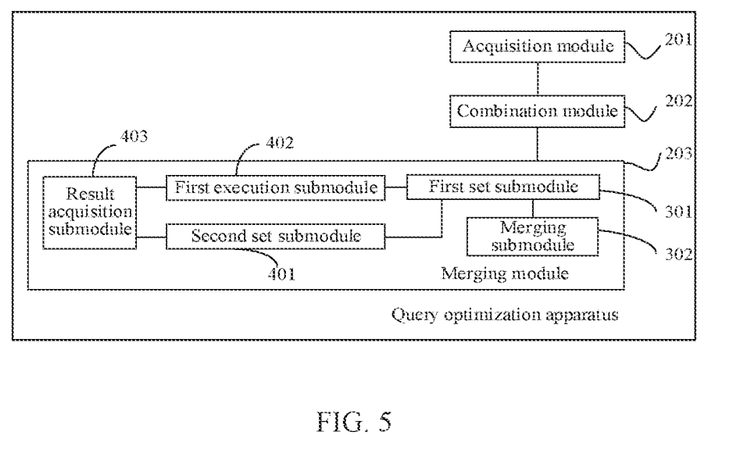
FIG. 5 is a schematic diagram illustrating a query optimization apparatus according to an embodiment.

FIG. 5 is a schematic diagram of a query optimization apparatus according to an embodiment. In the embodiment, the merging module 203 further includes: a second set submodule 401, configured to determine, from the combined task based on the query dependence relationship, subtasks that depend on each subtask in the first task set, to form a second task set of the combined task; a first execution submodule 402, configured to execute the subtasks in the first task set, and store query results; and a result acquisition submodule 403, configured to: if the second task set and the first task set have same subtasks with a same query condition and query data source, obtain a query result of the subtask in the first task set as a query result of the same subtask in the second task set.

In an embodiment, each subtask includes a query data source, and the query data source includes at least two data sources of different physical architectures.

Figure 6:
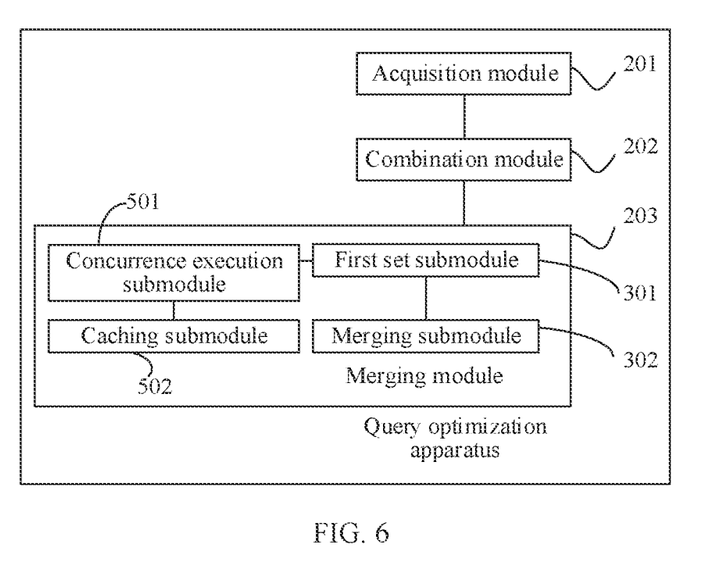
FIG. 6 is a schematic diagram illustrating a query optimization apparatus according to an embodiment.
Figure 7:
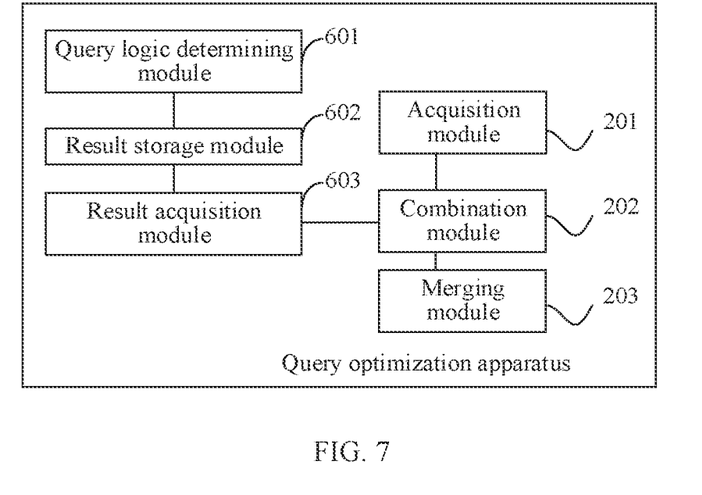
FIG. 7 is a schematic diagram illustrating a query optimization apparatus according to an embodiment.

FIG. 6 is a schematic diagram of a query optimization apparatus according to an embodiment. In the embodiment, the merging module 203 further includes: a concurrence execution submodule 501, configured to concurrently execute the subtasks in the first task set; and a caching submodule 502, configured to place, into a cache, a query result of a subtask whose query duration meets a predetermined condition, FIG. 7 is a schematic diagram of a query optimization apparatus according to an embodiment. In the embodiment, the apparatus further includes: a query logic determining module 601, configured to determine a first query logic from a query task based on a predetermined determining condition, the first query logic including at least one subtask in the same query task; a result storage module 602, configured to store a query result of the first query logic; and a result acquisition module 603, configured to: if determining that query logic that is the same as the first query logic exists in the combined task, obtain the query result of the first query logic as a query result of the query logic that is the same as the first query logic.

The apparatus embodiments correspond to the method embodiments. For related parts, references can be made to related descriptions in the method embodiments. The apparatus embodiments described above are merely examples. The modules described as separate parts may or may not be physically separate, and parts displayed as units may be located in one position or distributed on a plurality of networks. Each module may be implemented by software, or hardware, or a combination of software and hardware. Some or all of the modules can be selected based on actual needs.

Embodiments of the present specification further provides a query optimization apparatus, including a processor, and a memory storing instructions executable by the processor. The processor is configured to perform any of the above query optimization methods.

Figure 8:
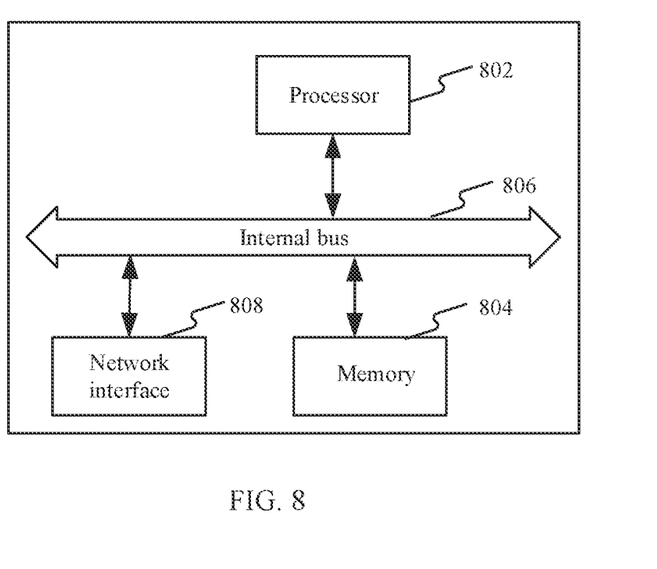
FIG. 8 is a schematic diagram illustrating a query optimization apparatus according to an embodiment.

FIG. 8 is a schematic diagram of a query optimization apparatus according to an embodiment. Referring to FIG. 8, the query optimization apparatus includes a processor 802 and a memory 804. The query optimization apparatus may further include an internal bus 806 and a network interface 808. The memory 804 stores instructions executable by the processor 802. The processor 802 is configured to perform any of the above query optimization methods.

Embodiments of the present specification further provide a non-transitory computer readable storage medium having stored therein instructions that, when executed by a processor of a device, cause the device to perform any of the above query optimization methods.

The non-transitory computer-readable storage medium can be a read-only memory (ROM), a random access memory (RAM), a CD-ROM, a magnetic tape, a floppy disk, an optical data storage device, etc., which is not limited in the present specification.

Other embodiments of the present specification will be apparent to those skilled in the art from consideration and practice of the specification. The present specification is intended to cover any variations, uses, or adaptations of the present specification that follow the general principles of the present specification and include common knowledge or conventional techniques that are not disclosed in the technical field of the present specification. The present specification and the embodiments are merely examples, and the actual scope and the spirit of the present specification are indicated by the following claims.

It should be understood that the present specification is not limited to the precise structures that have been described above and illustrated in the accompanying drawings, and various modifications and changes can be made without departing from the scope of the present specification. The scope of the present specification is limited by the appended claims only.

The invention claimed is:

1. A query optimization method, comprising:
   obtaining a plurality of query tasks to be optimized, each query task including at least one subtask, and when a same query task includes at least two subtasks, a query dependence relationship existing between the at least two subtasks;
   combining the plurality of query tasks based on the query dependence relationship to obtain a combined task; and
   merging at least two subtasks in different query tasks of the plurality of query tasks based on the combined task to obtain a first merged subtask, the first merged subtask being executed to obtain query results of the at least two subtasks in the different query tasks,
   wherein the merging the at least two subtasks in the different query tasks to obtain the first merged subtask includes:
   determining all non-dependent subtasks of the plurality of query tasks based on the query dependence relationship, to form a first task set of the combined task, wherein each non-dependent subtask is a subtask that can be executed without depending on any other subtask, and the first task set includes all non-dependent subtasks of the plurality of query tasks; and
   merging at least two non-dependent subtasks in the first task set to obtain the first merged subtask;

wherein the method further includes:
after forming the first task set of the combined task, determining, from the combined task based on the query dependence relationship, subtasks that depend on each subtask in the first task set that includes all non-dependent subtasks of the plurality of query tasks, to form a second task set of the combined task;
executing the subtasks in the first task set and storing query results; and
if the second task set and the first task set have subtasks with a same query condition and query data source, using a query result of a subtask in the first task set as a query result of the same subtask in the second task set,
wherein executing the subtasks in the first task set and storing the query results include:
concurrently executing the subtasks in the first task set; and
placing, into a cache, a query result of a subtask whose query duration meets a predetermined condition.

2. The method according to claim 1, wherein each subtask includes a query condition and a query data source; and the merging the at least two non-dependent subtasks in the first task set to obtain the first merged subtask includes:
merging at least two non-dependent subtasks in the first task set that have a same query condition and query data source, to obtain the first merged subtask.

3. The method according to claim 1, wherein each subtask includes a query data source; and the merging the at least two non-dependent subtasks in the first task set to obtain the first merged subtask includes:
determining a plurality of subtasks with a same query data source from the first task set; and
merging at least two non-dependent subtasks whose query paths have a same part in the plurality of subtasks with the same query data source, to obtain the first merged subtask.

4. The method according to claim 1, wherein each subtask includes a query data source, and the query data source includes at least two data sources of different physical architectures.

5. The method according to claim 1, further comprising:
before the combining the plurality of query tasks to obtain the combined task, determining a first query logic from a query task based on a predetermined determining condition, the first query logic including at least one subtask in the same query task; and storing a query result of the first query logic; and
after the combining the plurality of query tasks to obtain the combined task, in response to determining that a query logic that is the same as the first query logic exists in the combined task, using the query result of the first query logic as a query result of the query logic that is the same as the first query logic.

6. A query optimization apparatus, comprising:
a processor; and
a memory storing instructions executable by the processor,
wherein the processor is configured to:
obtain a plurality of query tasks to be optimized, each query task including at least one subtask, and when a same query task includes at least two subtasks, a query dependence relationship existing between the at least two subtasks;
combine the plurality of query tasks based on the query dependence relationship to obtain a combined task; and
merge at least two subtasks in different query tasks of the plurality of query tasks based on the combined task to obtain a first merged subtask, the first merged subtask being executed to obtain query results of the at least two subtasks in the different query tasks, wherein the processor is further configured to:
determine all non-dependent subtasks of the plurality of query tasks based on the query dependence relationship, to form a first task set of the combined task, wherein each non-dependent subtask is a subtask that can be executed without depending on any other subtask, and the first task set includes all non-dependent subtasks of the plurality of query tasks; and
merge at least two non-dependent subtasks in the first task set to obtain the first merged subtask;
wherein the processor is further configured to:
after forming the first task set of the combined task, determine, from the combined task based on the query dependence relationship, subtasks that depend on each subtask in the first task set that includes all non-dependent subtasks of the plurality of query tasks, to form a second task set of the combined task;
execute the subtasks in the first task set, and store query results; and
if the second task set and the first task set have subtasks with a same query condition and query data source, use a query result of a subtask in the first task set as a query result of the same subtask in the second task set,
wherein in executing the subtasks in the first task set and storing the query results, the processor is further configured to:
concurrently execute the subtasks in the first task set; and
place, into a cache, a query result of a subtask whose query duration meets a predetermined condition.

7. The apparatus according to claim 6, wherein each subtask includes a query condition and a query data source; and the processor is further configured to:
merge at least two non-dependent subtasks in the first task set that have a same query condition and query data source, to obtain the first merged subtask.

8. The apparatus according to claim 6, wherein each subtask includes a query data source; and the processor is further configured to:
determine a plurality of subtasks with a same query data source from the first task set; and
merge at least two non-dependent subtasks whose query paths have a same part in the plurality of subtasks with the same query data source, to obtain the first merged subtask.

9. The apparatus according to claim 6, wherein each subtask includes a query data source, and the query data source includes at least two data sources of different physical architectures.

10. The apparatus according to claim 6, wherein the processor is further configured to:
determine a first query logic from a query task based on a predetermined determining condition, the first query logic including at least one subtask in the same query task;
store a query result of the first query logic; and
in response to determining that a query logic that is the same as the first query logic exists in the combined task, obtain the query result of the first query logic as a query result of the query logic that is the same as the first query logic.

11. A non-transitory computer readable storage medium having stored therein instructions that, when executed by a processor of a device, cause the device to perform a query optimization method, the method comprising:

obtaining a plurality of query tasks to be optimized, each query task including at least one subtask, and when a same query task includes at least two subtasks, a query dependence relationship existing between the at least two subtasks;

combining the plurality of query tasks based on the query dependence relationship to obtain a combined task; and merging at least two subtasks in different query tasks of the plurality of query tasks based on the combined task to obtain a first merged subtask, the first merged subtask being executed to obtain query results of the at least two subtasks in the different query tasks, wherein the merging the at least two subtasks in the different query tasks to obtain the first merged subtask includes:

determining all non-dependent subtasks of the plurality of query tasks based on the query dependence relationship, to form a first task set of the combined task, wherein each non-dependent subtask is a subtask that can be executed without depending on any other subtask, and the first task set includes all non-dependent subtasks of the plurality of query tasks; and merging at least two non-dependent subtasks in the first task set to obtain the first merged subtask;

wherein the method further includes:

after forming the first task set of the combined task, determining, from the combined task based on the query dependence relationship, subtasks that depend on each subtask in the first task set that includes all non-dependent subtasks of the plurality of query tasks, to form a second task set of the combined task;

executing the subtasks in the first task set and storing query results; and if the second task set and the first task set have subtasks with a same query condition and query data source, using a query result of a subtask in the first task set as a query result of the same subtask in the second task set, wherein executing the subtasks in the first task set and storing the query results include:

concurrently executing the subtasks in the first task set; and placing, into a cache, a query result of a subtask whose query duration meets a predetermined condition.

* * * * *